United States Patent
Seagren

(10) Patent No.: US 12,549,118 B2
(45) Date of Patent: Feb. 10, 2026

(54) SUSTAINED UNDERVOLTAGE PROTECTION

(71) Applicant: Hamilton Sundstrand Corporation, Charlotte, NC (US)

(72) Inventor: Robert L. Seagren, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 196 days.

(21) Appl. No.: 18/242,728

(22) Filed: Sep. 6, 2023

(65) Prior Publication Data

US 2025/0080016 A1  Mar. 6, 2025

(51) Int. Cl.
| H03K 5/24 | (2006.01) |
| H02P 9/00 | (2006.01) |
| H02P 9/48 | (2006.01) |
| H02P 25/024 | (2016.01) |

(52) U.S. Cl.
CPC ............... H02P 9/006 (2013.01); H02P 9/48 (2013.01); H02P 25/024 (2016.02)

(58) Field of Classification Search
CPC .......... H02P 9/006; H02P 9/48; H02P 25/024; H02H 1/04; H02H 3/24; H02H 3/247; H02H 7/06
See application file for complete search history.

(56) References Cited

U.S. PATENT DOCUMENTS

| 5,422,778 | A | 6/1995 | Good et al. |
| 5,495,381 | A | 2/1996 | Mrowiec et al. |
| 7,633,272 | B2 * | 12/2009 | Yao ................. H02P 9/10 322/59 |
| 8,294,429 | B2 | 10/2012 | Fuller et al. |
| 8,688,283 | B2 | 4/2014 | Ganev et al. |
| 10,000,296 | B2 | 6/2018 | Seger et al. |
| 10,199,968 | B2 | 2/2019 | Seidl et al. |
| 10,833,616 | B1 | 11/2020 | Silverstein et al. |
| 11,677,229 | B2 | 6/2023 | Renotte et al. |
| 2021/0376742 | A1 * | 12/2021 | Liu .................. H02M 3/33507 |
| 2022/0048393 | A1 | 2/2022 | Matheson et al. |
| 2022/0077674 | A1 * | 3/2022 | Asam ................ H02H 3/247 |
| 2024/0084710 | A1 * | 3/2024 | Trainer .............. H02P 9/48 |

FOREIGN PATENT DOCUMENTS

| CN | 113054619 A | 6/2021 |
| CN | 110676812 B | 4/2023 |

OTHER PUBLICATIONS

European Search Report dated Mar. 14, 2025 in connection with European Patent Application No. 24 19 9049, 11 pages.

* cited by examiner

Primary Examiner — Muhammad S Islam

(57) ABSTRACT

A method includes detecting a modulating undervoltage state having transients above an undervoltage threshold and triggering a protection upon detecting the modulating undervoltage state. The method can include detecting a steady state undervoltage condition, wherein triggering a protection includes triggering the protection upon detecting the steady state undervoltage condition or the modulating undervoltage state. A system includes a power source including a feedback sensor at a point of regulation (POR) of the power source configured to generate feedback indicative of voltage at the POR. A controller is operatively connected to receive the feedback. The controller includes controller logic that is configured perform a method as described above.

20 Claims, 2 Drawing Sheets

SUSTAINED UNDERVOLTAGE PROTECTION

BACKGROUND

1. Field

The present disclosure relates to power quality control for electrical power systems, and more particularly to undervoltage protection for aerospace applications.

2. Description of Related Art

In systems using a synchronous generator, a generator control unit (GCU) provides a voltage regulation function via closed loop control. If a failure occurs within the GCU or the generator, the regulated voltage at the point of regulation (POR) can be impacted in such a way that it falls out of specified limits. Traditionally, an undervoltage (UV) protection is provided within the GCU that compares a measured POR voltage to a predetermined level and time delay. If the voltage remains below this predetermined threshold longer than the specified time delay, then the GCU actuates a protection that removes excitation to the generator and opens the main line contactor. This style of protection expects the voltage remains below a threshold for the entire time delay for it to actuate. However, there are failure cases where the GCU regulation function can have a failure that causes the POR voltage to modulate above and below the traditional UV protection thresholds. If this modulation occurs continuously it can drive the power quality to the loads serviced by the generator outside predetermined power quality limits.

The conventional techniques have been considered satisfactory for their intended purpose. However, there is an ever present need for improved systems and methods for determining when these modulating undervoltage cases are occurring and providing the appropriate UV protection functions. This disclosure provides a solution for this need.

SUMMARY

A method includes detecting a modulating undervoltage state having transients above an undervoltage threshold and triggering a protection upon detecting the modulating undervoltage state.

The method can include detecting a steady state undervoltage condition. Triggering a protection can include triggering the protection upon detecting the steady state undervoltage condition or the modulating undervoltage state. Triggering the protection can include removing a generator output from an electrical system by at least one of opening a generator control unit (GCU) generator control relay, removing generator excitation, and/or opening a main line contactor. The protection function can include deployment of a ram air turbine (RAT) by an emergency controller.

Detecting the modulating undervoltage state can include receiving feedback from a POR (point of regulation) in a generator system as voltage input, comparing the voltage input against a predetermined set threshold, and setting a latch if the input voltage falls below the predetermined set threshold. The method can include resetting the latch only if the input voltage rises above a reset voltage and remains above that level for time delay.

The latch can be a first latch and the method can include setting a second latch if the input voltage does not recover above the reset threshold for a second time delay, wherein the second latch being set triggers the protection. The method can include resetting the first latch if the input voltage falls below a normal limit due to a normal action. Resetting the first latch can include using a second voltage threshold to determine if a generator in the generator system is offline, and resetting the first latch if the input voltage is below the second voltage threshold for a third time delay. The first and third time delays can each be shorter in duration than the second time delay to prevent nuisance trip conditions.

A system includes a power source including a feedback sensor at a point of regulation (POR) of the power source configured to generate feedback indicative of voltage at the POR. A controller is operatively connected to receive the feedback. The controller includes controller logic that is configured perform a method as described above.

The controller can be configured to detect a steady state undervoltage condition. Triggering a protection can include triggering the protection upon detecting the steady state undervoltage condition or the modulating undervoltage state. The power source can include a generator with an output connected to supply power to an electrical system, wherein triggering the protection includes removing the generator output from the electrical system by at least one of opening a generator control unit (GCU) generator control relay, removing generator excitation, and/or opening a main line contactor. A ram air turbine (RAT) can be operatively connected to supply the electrical system as a backup to the power source, wherein the protection includes deployment of the RAT by an emergency controller.

The controller logic can be implemented in analog circuitry, a microprocessor/DSP (digital signal processor), or FPGA (field programmable gate array). The controller can include multiple processors, wherein the detecting and triggering are implemented in a redundant process across different processors to provide backup processes of protection. The controller logic can be implemented in analog circuitry as a primary or redundant protection either within the controller or external to the controller.

The power source can be a high voltage direct current (HVDC) power source, and the electrical system can be an HVDC electrical system. A VSCF (variable speed constant frequency) regulator can connect between the power source and the electrical system. The controller can be configured to trigger the protection based on voltage feedback from multiple phases that track each other.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
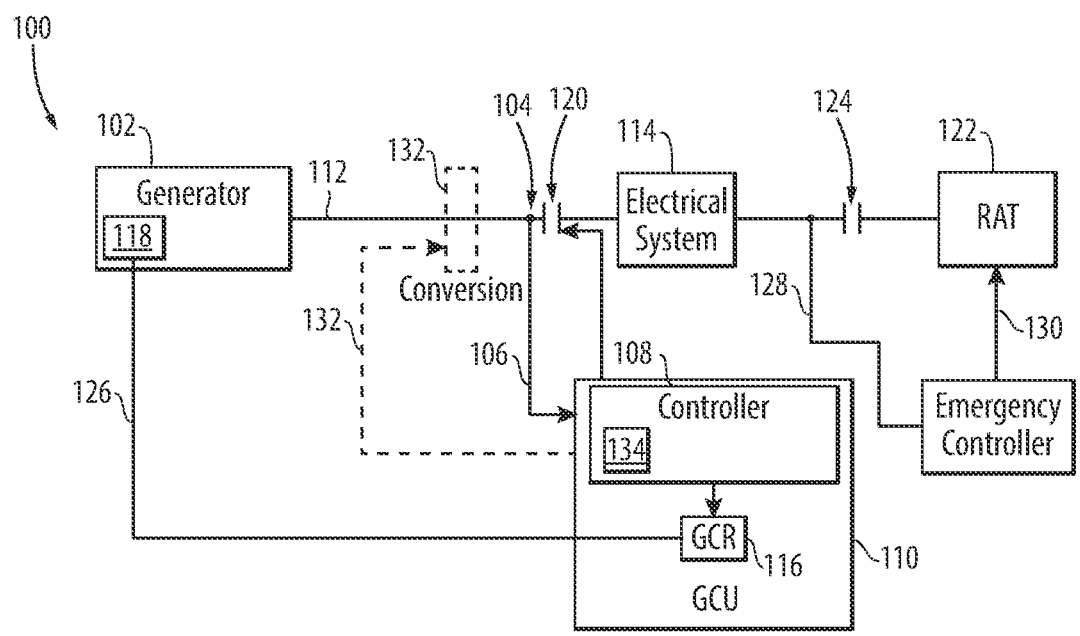
FIG. 1 is a schematic perspective view of an embodiment of a system constructed in accordance with the present disclosure, showing the generator, electrical system powered by the generator, and the controller with the protection functions.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to provide undervoltage protection for steady state undervoltage as well as for modulating undervoltage, e.g. for use in aerospace applications.

The system 100 includes a power source 102, e.g. a synchronous generator, including a feedback sensor 104 at a point of regulation (POR) of the power source configured to generate feedback 106 indicative of voltage at the POR. A controller 108, which can be a generator control unit (GCU) 110, can be connected to the GCU 110, or can be a separate module of the GCU 110, is operatively connected to receive the feedback 106. The controller 108 includes controller logic that is configured perform a method such as described below.

The power source 102 has an output 112 connected to supply power to an electrical system 114, e.g. a power bus aboard an aircraft. Triggering the protection can include removing the output 112 from the electrical system 114 by at least one of opening a GCU control relay 116, removing generator excitation in the exciter 118, and/or opening a main line contactor 120 to isolate the power source 102 from the electrical system 114. A ram air turbine (RAT) 122 can be operatively connected to supply the electrical system 114 as a backup to the power source, wherein the protection includes auto deployment of the RAT (by the emergency controller indicated in FIG. 1) and/or closing an electrical contactor 124 to connect the RAT 122 to the electrical system 114, via control lines 128, 130. Those skilled in the art will readily appreciate that the control lines 106, 128, 130, and the line from the relay 116, can be wired lines, optical lines, wireless lines, or any other suitable lines of communicating feedback and control signals.

The logic of the controller 108, for implementing methods as described below, can be implemented in analog circuitry, as a microprocessor/DSP (digital signal processor), or as a, FPGA (field programmable gate array). The controller 108 can include multiple processors 134, wherein the detecting and triggering are implemented in a redundant process across different processors 134 to provide backup processes of protection. The controller logic can be implemented in analog circuitry as a primary or redundant protection either within the same controller 108 or external to the primary controller 108.

The power source 102 can be a high voltage direct current (HVDC) power source, and the electrical system 114 can be an HVDC electrical system, which can be accomplished via passive or active rectification or power source 102 output. The power source 102 output is rectified by conversion block 132. The POR in this case is a single DC feed. If the system 100 includes a power source 102 that is a VSCF (variable speed constant frequency) generator, a conversion block 132 can connect between the power source 102 and the electrical system 114 with a line (indicated by a broken line in FIG. 1) connecting the conversion block 132 for control/feedback to/from the GCU 110. In this case, the controller 108 is configured to trigger the protection based on voltage feedback from multiple phases that track each other. The method described below with reference to FIG. 2 could be applied to VSCF regulators with minor modifications, namely in a VSCF application the OR gate 136 for VRESET would need to be converted to and AND gate.

Figure 2:
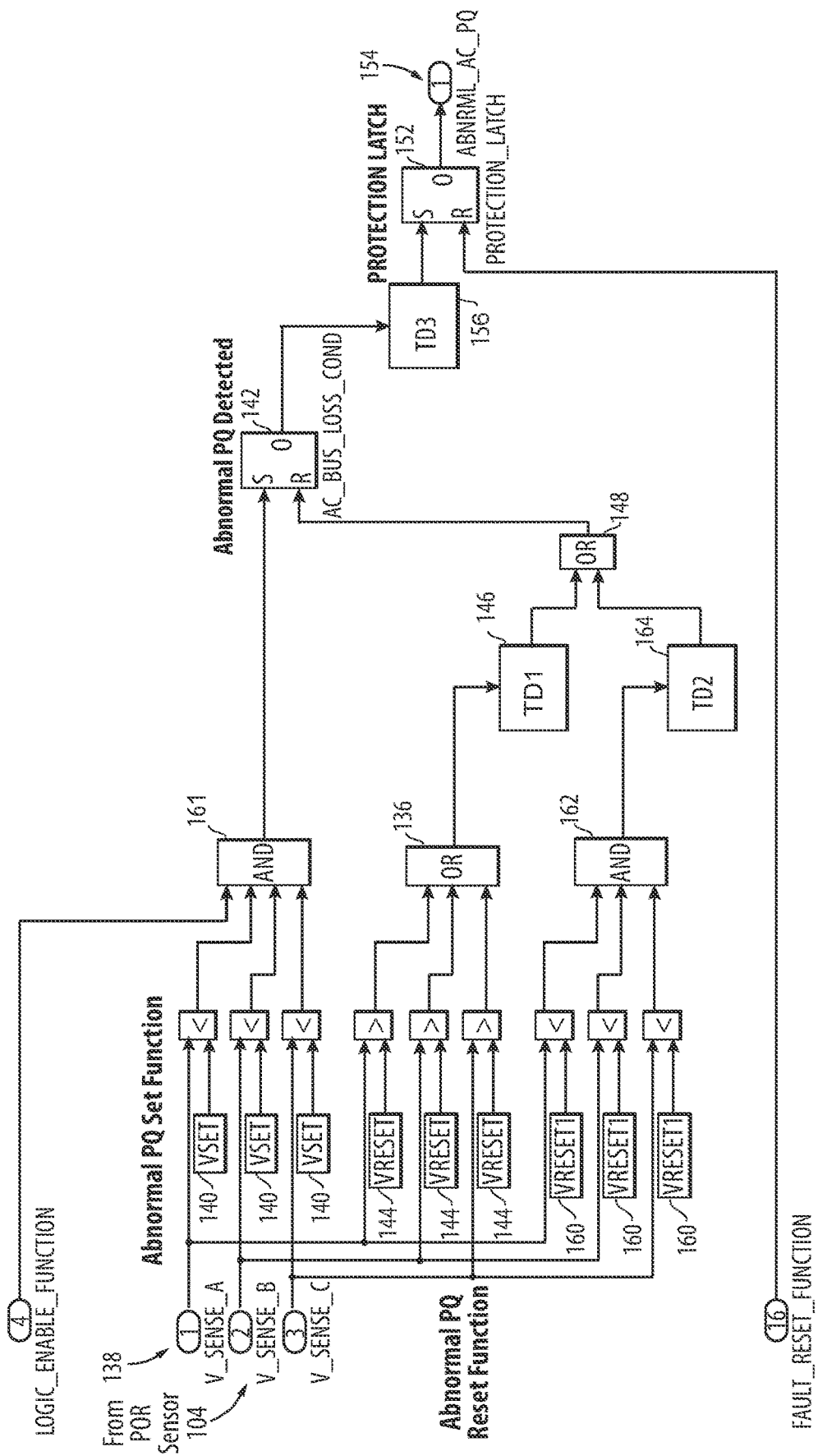
FIG. 2 is a logic diagram showing protection functions of the controller of FIG. 1.

With reference now to FIG. 2, the logic 200 for the methods of the protection functions of the controller 108 of FIG. 1 are described. The method includes detecting a modulating undervoltage state, e.g. with the sensor 104 at the POR, having transients above an undervoltage threshold and triggering a protection upon detecting the modulating undervoltage state. The method can also include detecting a steady state undervoltage condition, and triggering the protection upon detecting the steady state undervoltage condition or the modulating undervoltage state. As explained above with reference to FIG. 1, triggering the protection can include removing a generator output from an electrical system by at least one of opening a generator control unit (GCU) generator control relay, removing generator excitation, opening a main line contactor.

Detecting the modulating undervoltage state includes receiving feedback 138 from a POR in a generator system as voltage input, comparing the voltage input against a predetermined set threshold (VSET) 140, and setting a latch 142 (which can be implemented as software or hardware) if the input voltage 138 (in all sense phases via the AND gate 161) falls below the predetermined set threshold VSET 140. The set or latched condition of the first latch 142 is denoted as AC_BUS_LOSS_COND in FIG. 2. The voltage input 138 is shown as three phase (V_SENSE_A, V_SENSE_B, V_SENSE_C) but it could be single phase or any number of phases.

The method includes resetting the latch 142, resetting the AC_BUS_LOSS_COND condition, only if the input voltage 138 of one of the sensed phases rises above a predetermined hysteresis reset voltage (VRESET) 144 and remains above that level for time delay (TD1) 146. The OR gate 136 can be changed to an AND gate as explained above, it the power source is a VSCF power source, so that if all of the input voltages 138 rise above VRESET 144 for TD1 146, then the latch 142 can be reset. Either way, the gate 136 is able to reset the latch 142 by way of the OR gate 148.

The method includes setting a second latch (PROTECTION_LATCH) 152 to generate the protection trigger signal (ABNRML_AC_PQ) 154 if the input voltage input 138 does not recover above the reset threshold (VRESET) 144 for a second time delay (TD3) 156. The first latch 142 not being reset within the time delay (TD3) 156 sets the protection latch 152.

With continued reference to FIG. 2, the method 200 includes resetting the first latch 142 if the input voltage 138 falls below a normal limit due to a normal action. This normal action can include power down, i.e. a powering down under normal conditions as when an aircraft powers down after a flight. This reset allows the first latch 142 to reset when power cycles, e.g. for each new flight of an aircraft. Resetting the power quality (PQ) condition of the first latch 142 includes using a second voltage threshold (VRESET1) 160 to determine if a generator in the generator system is offline, and resetting the first latch 142 if all sensed phases of the input voltage 138, via the AND gate 162 are below the second voltage threshold (VRESET1) 160 for a third time delay (TD2) 164. The output of the AND gate 162 is connected to the OR gate 148, as one of the resets for the latch 142. The first and third time delays (TD1) 142 and (TD2) 164 are each shorter in duration than the second time delay (TD3) 156 to prevent nuisance trip conditions.

Systems and methods as disclosed herein provide potential benefits including the following. They can provide an ability to detect failures that lead to modulating voltage. Previous protections could easily be reset in these conditions whereas systems and methods as disclosed herein can prevent loads from being subjected to bad power quality continuously. Methods as disclosed herein are modular and can be used in different controllers to provide different outcomes. Systems and methods as disclosed herein can provide for DC conversion protection, RAT deployment, and any other suitable type of protection. Systems and methods as disclosed herein can be applied to other PQ items such as frequency.

The methods and systems of the present disclosure, as described above and shown in the drawings, provide for undervoltage protection for steady state undervoltage as well as for modulating undervoltage, e.g. for use in aerospace applications. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
   detecting a modulating undervoltage state having transients above an undervoltage threshold; and
   triggering a protection upon detecting the modulating undervoltage state, wherein triggering the protection includes removing a generator output from an electrical system by at least one of opening a generator control unit (GCU) generator control relay, removing generator excitation, or opening a main line contactor.

2. The method as recited in claim 1, further comprising:
   detecting a steady state undervoltage condition; and
   triggering the protection upon detecting the steady state undervoltage condition.

3. The method as recited in claim 1, wherein detecting the modulating undervoltage state includes:
   receiving feedback from a point of regulation (POR) in a generator system as input voltage;
   comparing the input voltage against a predetermined set threshold; and
   setting a latch in response to the input voltage falling below the predetermined set threshold.

4. The method as recited in claim 1, wherein the protection includes deployment of a ram air turbine (RAT) by an emergency controller.

5. The method as recited in claim 3, further comprising resetting the latch only in response to the input voltage rising above a reset threshold and remaining above the reset threshold for a first time delay.

6. The method as recited in claim 5, wherein the latch is a first latch and further comprising setting a second latch in response to the input voltage not recovering above the reset threshold for a second time delay, wherein setting the second latch triggers the protection.

7. The method as recited in claim 6, further comprising resetting the first latch in response to the input voltage falling below a normal limit due to a normal action.

8. The method as recited in claim 7, wherein resetting the first latch includes using a voltage threshold to determine if a generator in the generator system is offline, and resetting the first latch in response to the input voltage being below the voltage threshold for a third time delay.

9. The method as recited in claim 8, wherein the first and third time delays are each shorter in duration than the second time delay to prevent nuisance trip conditions.

10. A system comprising:
    a power source including a feedback sensor at a point of regulation (POR) of the power source configured to generate feedback indicative of voltage at the POR, wherein the power source includes a generator with a generator output configured to supply power to an electrical system; and
    a controller operatively connected to receive the feedback, wherein the controller includes controller logic that is configured to:
      detect a modulating undervoltage state having transients above an undervoltage threshold; and
      trigger a protection upon detecting the modulating undervoltage state, wherein the protection includes removal of the generator output from the electrical system by at least one of opening of a generator control unit (GCU) generator control relay, removal of generator excitation, or opening of a main line contactor.

11. The system as recited in claim 10, wherein the controller is further configured to:
    detect a steady state undervoltage condition; and
    trigger the protection upon detecting the steady state undervoltage condition.

12. The system as recited in claim 10, wherein the controller logic is implemented in analog circuitry, a microprocessor, a digital signal processor (DSP), or a field programmable gate array (FPGA).

13. The system as recited in claim 10, wherein the controller includes multiple processors configured to execute a redundant process to detect the modulating undervoltage state and trigger the protection to provide backup processes of protection.

14. The system as recited in claim 10, wherein the controller logic is implemented in analog circuitry as a primary or redundant protection.

15. The system as recited in claim 10, further comprising a ram air turbine (RAT) operatively connected to supply the electrical system as a backup to the power source, wherein the protection includes deployment of the RAT by an emergency controller.

16. The system as recited in claim 10, wherein the power source is a high voltage direct current (HVDC) power source, and wherein the electrical system is an HVDC electrical system.

17. The system as recited in claim 10, further comprising a variable speed constant frequency (VSCF) regulator connected between the power source and the electrical system.

18. The system of claim 10, wherein the controller logic is further configured to:
    receive the feedback from the POR as input voltage;
    compare the input voltage against a predetermined set threshold; and
    set a latch in response to the input voltage falling below the predetermined set threshold.

19. The system as recited in claim 17, wherein the controller is configured to trigger the protection based on voltage feedback from multiple phases that track each other.

20. A method comprising:
    detecting a modulating undervoltage state having transients above an undervoltage threshold, wherein detecting the modulating undervoltage state comprises:

receiving feedback from a point of regulation (POR) in a generator system as input voltage;
comparing the input voltage against a predetermined set threshold; and
setting a latch in response to the input voltage falling below the predetermined set threshold; and
triggering a protection upon detecting the modulating undervoltage state.

* * * * *